UNITED STATES PATENT OFFICE.

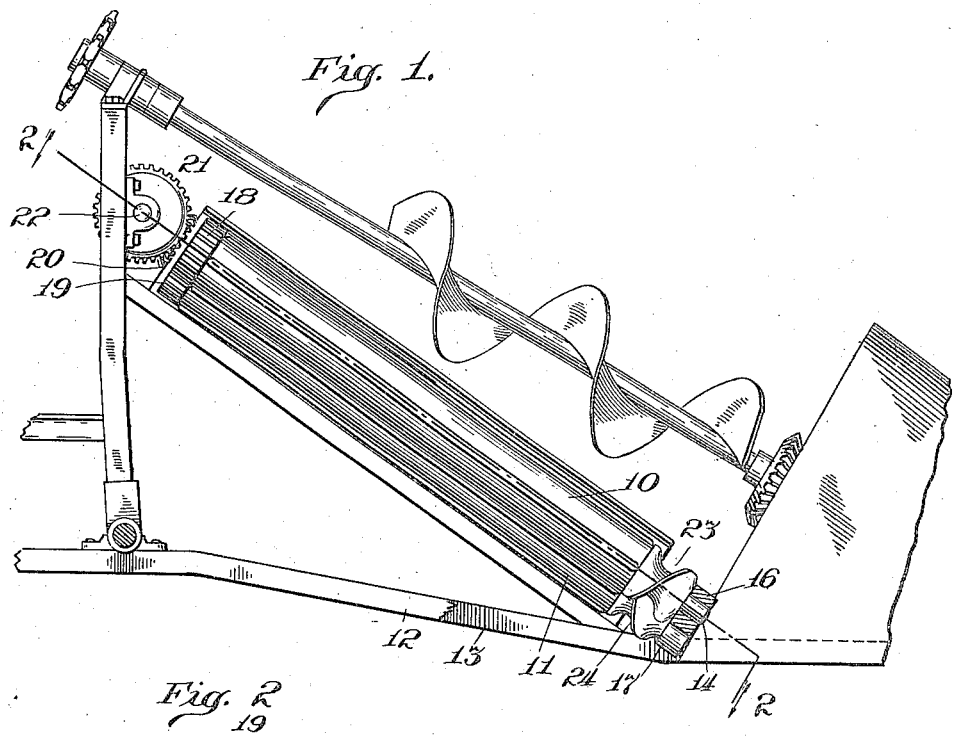
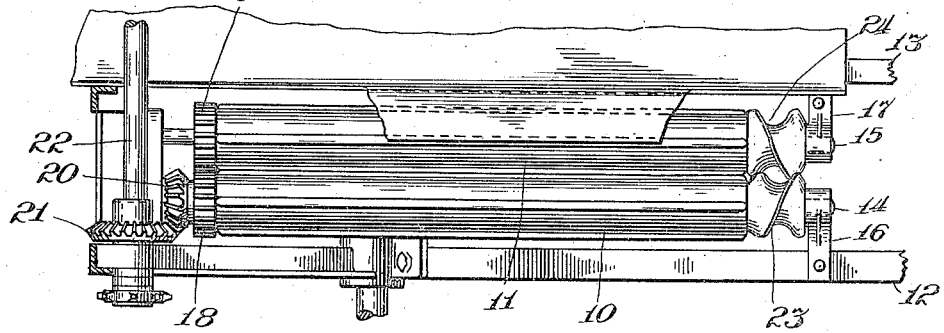
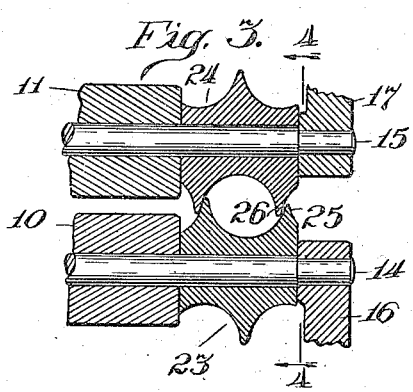
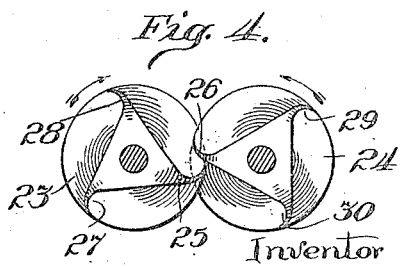

WILLIAM HIBBS, OF OSKALOOSA, IOWA.

CORN-HARVESTER.

1,240,847.

Specification of Letters Patent.  Patented Sept. 25, 1917.

Application filed July 7, 1916. Serial No. 107,967.

*To all whom it may concern:*

Be it known that I, WILLIAM HIBBS, a citizen of the United States, and resident of Oskaloosa, county of Mahaska, and State of Iowa, have invented certain new and useful Improvements in Corn-Harvesters, of which the following is a specification, and which are illustrated in the accompanying drawings, forming a part thereof.

The invention relates to corn harvesters and more particularly to those in which the ears of corn are removed from the standing stalks by the coöperation of a pair of inclined snapping rolls which receive the stalks between them. The object of the invention is to provide a construction which will facilitate the gathering of those ears of corn which grow close to the ground, or are found upon broken or overturned stalks, and thereby insure the harvesting of the entire crop. To this end the invention contemplates an improved construction for the forward or entering ends of the snapping rolls.

In the accompanying drawings,

Figure 1 is a detail side elevation of a corn harvester embodying the features of improvement provided by the invention, some of the parts being shown in section and others broken away, Fig. 2 is an inclined front view of the snapping rolls, the associated parts of the frame being shown in section on the plane indicated by the line 2—2 in Fig. 1, Fig. 3 is an enlarged central plan sectional view of the forward end portions of the snapping rolls and the supports therefor, and Fig. 4 is a sectional view taken on the line 4—4 of Fig. 3.

The usual forwardly inclined longitudinally ribbed snapping rolls are indicated in the drawings at 10 and 11. These rolls are carried by parts 12 and 13 of the machine frame to receive the stalks of corn between them during the forward movement of the machine. As shown, the frame parts 12 and 13 are unconnected at their forward ends to permit of their straddling the rows of corn. Brackets 16, 17, one mounted upon each of the frame parts 12 and 13, serve as journals for the forward ends of the spindles 14, 15 of the snapping rolls. Preferably the brackets 16, 17, are spaced apart a sufficient distance to permit the stalks of corn to pass between them.

The snapping rolls 10 and 11 are geared together at their inner ends through intermeshing spur gears 18, 19, one mounted on each of the rolls. The two rolls accordingly rotate in opposite directions and they are preferably driven to turn toward each other at the front or upper side. For this purpose, one of the rolls is provided with a beveled pinion 20 and this pinion meshes with a beveled gear 21, on a counter shaft 22.

In carrying out the invention, the snapping rolls 10 and 11 are constructed at their forward ends to positively engage the corn stalks and feed them toward the longitudinal ribbed body portions of the rolls. As shown, the forward end portions of the two rolls 10 and 11 are formed with Archimedean screws 23, 24 of opposite inclination or pitch. These Archimedean screws are preferably of such diameter in proportion to the spacing of the rolls 10, 11 that the turns or threads of the two screws overlap or intermesh during the rotation of the rolls, as most clearly shown in Fig. 3. It follows from this construction that as the rolls 10 and 11 approach each stalk of corn, the threads, as 25, 26, of the Archimedean screws close together at their forward ends about the stalk and insure its being positively moved toward the longitudinally ribbed body portions of the rolls. This action is facilitated if each Archimedean screw 23, 24 is formed with a plurality of threads, as, 25, 27, 28 or 26, 29, 30 (Fig. 4).

I claim as my invention,—

In a corn harvester, in combination, a pair of oppositely turning parallel inclined snapping rolls having their lower ends directed forwardly and a set of multiple spiral threads, each of a uniform diameter throughout its length greater than that of the corresponding roll, formed upon the forward end of each roll, the two sets of threads being of like shape but opposite pitch and intermeshing and each thread making only a single turn about the axis of the corresponding roll.

WILLIAM HIBBS.

Copies of this patent may be obtained for five cents each, by addressing the "Commissioner of Patents, Washington, D. C."